United States Patent
Kim et al.

(10) Patent No.: US 10,046,312 B2
(45) Date of Patent: Aug. 14, 2018

(54) OXIDATION CATALYST, METHOD FOR PREPARING SAME, AND FILTER FOR EXHAUST GAS PURIFICATION COMPRISING SAME

(71) Applicant: Corning Precision Materials Co., Ltd., Chungcheongnam-do (KR)

(72) Inventors: Wun Gwi Kim, Chungcheongnam-do (KR); Min Seok Kim, Chungcheongnam-do (KR); Hyung Rae Kim, Chungcheongnam-do (KR); Goo Soo Lee, Chungcheongnam-do (KR); Jae Myung Chang, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 122 days.

(21) Appl. No.: 15/037,598

(22) PCT Filed: Nov. 18, 2014

(86) PCT No.: PCT/KR2014/011083
§ 371 (c)(1),
(2) Date: May 18, 2016

(87) PCT Pub. No.: WO2015/072817
PCT Pub. Date: May 21, 2015

(65) Prior Publication Data
US 2016/0288103 A1    Oct. 6, 2016

(30) Foreign Application Priority Data

Nov. 18, 2013  (KR) .................. 10-2013-0139899
Apr. 16, 2014  (KR) .................. 10-2014-0045435

(51) Int. Cl.
*B01J 23/83*    (2006.01)
*C22C 1/02*    (2006.01)
(Continued)

(52) U.S. Cl.
CPC .......... *B01J 23/894* (2013.01); *B01D 53/944* (2013.01); *B01D 53/9436* (2013.01); *B01J 23/83* (2013.01);
(Continued)

(58) Field of Classification Search
CPC ...... B01J 23/894; B01J 23/83; B01J 35/0006; B01J 37/0072; B01J 37/0081;
(Continued)

(56) References Cited

U.S. PATENT DOCUMENTS 4,836,982 A * 6/1989 Brupbacher ............ C22C 32/00
                                                           420/129
4,973,369 A * 11/1990 Masumoto ............... B01J 23/75
                                                           148/421
(Continued)

FOREIGN PATENT DOCUMENTS

CN    10-2808140    * 12/2012    ............. B22D 11/06
JP    07-163879    *  6/1995    ............. B01J 23/72
(Continued)

OTHER PUBLICATIONS

International Search Report for Application No. PCT/KR2014/011083 dated Mar. 2, 2015.

*Primary Examiner* — Patricia L. Hailey
(74) *Attorney, Agent, or Firm* — Lerner, David, Littenberg, Krumholz & Mentlik, LLP

(57) ABSTRACT

The present invention relates to an oxidation catalyst, a method for preparing the same, and a filter for exhaust gas purification comprising the same and, more specifically, to an oxidation catalyst, a method for preparing the same, and
(Continued)

a filter for exhaust gas purification comprising the same, the oxidation catalyst being formed by comprising an amorphous metal alloy powder, thereby being preparable at a low cost, being capable of enhancing purification efficiency for exhaust gas when applied to the filter for exhaust gas purification, and being capable of deriving reliability enhancement for operation of an exhaust gas purifier having the filter for exhaust gas purification mounted therein. To this end, the present invention provides an oxidation catalyst, a method for preparing the same, and a filter for exhaust gas purification comprising the same, the oxidation catalyst characterized by being coated onto the carrier surface of the filter for exhaust gas purification and being formed by comprising an amorphous metal alloy powder.

10 Claims, 12 Drawing Sheets

(51) Int. Cl.

| | | |
|---|---|---|
| | *C22C 1/03* | (2006.01) |
| | *C22C 1/04* | (2006.01) |
| | *C22C 33/06* | (2006.01) |
| | *B01J 23/89* | (2006.01) |
| | *F01N 3/20* | (2006.01) |
| | *B01J 35/00* | (2006.01) |
| | *B01J 37/08* | (2006.01) |
| | *B01J 37/00* | (2006.01) |
| | *B01J 37/14* | (2006.01) |
| | *F01N 3/10* | (2006.01) |
| | *F01N 3/035* | (2006.01) |
| | *B01D 53/94* | (2006.01) |
| | *B01J 35/04* | (2006.01) |
| | *B01J 37/02* | (2006.01) |
| | *B01D 53/86* | (2006.01) |

(52) U.S. Cl.
CPC .......... *B01J 35/0006* (2013.01); *B01J 35/04* (2013.01); *B01J 37/0072* (2013.01); *B01J 37/0081* (2013.01); *B01J 37/0215* (2013.01); *B01J 37/08* (2013.01); *B01J 37/14* (2013.01); *F01N 3/035* (2013.01); *F01N 3/103* (2013.01); *F01N 3/20* (2013.01); *B01D 53/864* (2013.01); *B01D 53/8634* (2013.01); *B01D 2255/1021* (2013.01); *B01D 2255/1023* (2013.01); *B01D 2255/209* (2013.01); *B01D 2255/2027* (2013.01); *B01D 2255/2047* (2013.01); *B01D 2255/2061* (2013.01); *B01D 2255/2073* (2013.01); *B01D 2255/20707* (2013.01); *B01D 2255/20738* (2013.01); *B01D 2255/20746* (2013.01); *B01D 2255/20753* (2013.01); *B01D 2255/40* (2013.01); *B01D 2255/915* (2013.01); *B01D 2255/92* (2013.01); *B01D 2255/9202* (2013.01); *B01D 2257/406* (2013.01); *B01D 2257/502* (2013.01); *B01D 2258/0283* (2013.01); *B01J 2523/00* (2013.01); *F01N 2510/06* (2013.01); *F01N 2570/10* (2013.01); *F01N 2570/18* (2013.01)

(58) Field of Classification Search
CPC ........ B01J 37/0215; B01J 37/08; B01J 37/14; C22C 1/002; C22C 1/02; C22C 1/03; C22C 1/04; C22C 33/003; C22C 33/006; C22C 33/0257; C22C 33/04; C22C 33/06
USPC ................ 502/207, 324–326, 330, 337–339, 502/344–345, 347, 349; 420/8, 82, 83, 420/580, 581, 590; 419/1; 148/559, 561, 148/577–579
See application file for complete search history.

(56) References Cited

U.S. PATENT DOCUMENTS

| | | | | |
|---|---|---|---|---|
| 5,053,084 | A | * 10/1991 | Masumoto | .............. C22C 45/08 |
| | | | | 148/403 |
| 5,981,420 | A | 11/1999 | Nakano et al. | |
| 6,689,328 | B1 | 2/2004 | Otani et al. | |
| 2006/0254385 | A1* | 11/2006 | Tsuji | ....................... H01F 1/015 |
| | | | | 75/244 |
| 2010/0043927 | A1* | 2/2010 | Makino | ..................... C21D 5/00 |
| | | | | 148/612 |
| 2010/0265028 | A1* | 10/2010 | McHenry | .............. C22C 33/003 |
| | | | | 336/221 |
| 2014/0328714 | A1* | 11/2014 | Waniuk | ................... C22C 33/06 |
| | | | | 420/12 |

FOREIGN PATENT DOCUMENTS

| | | | | |
|---|---|---|---|---|
| JP | 07163879 | | 6/1995 | |
| JP | 07-275656 | * | 10/1995 | ............. B01D 53/56 |
| JP | 07275656 | | 10/1995 | |
| JP | 950313887 | A | 12/1995 | |
| JP | 10286467 | | 10/1998 | |
| JP | 2011-161330 | * | 8/2011 | ............. B01D 53/94 |
| JP | 2011161330 | A | 8/2011 | |
| KR | 1020010012376 | | 2/2001 | |
| KR | 10-2002-0269882 | * | 3/2002 | ............... F01N 3/00 |
| KR | 200269882 | | 3/2002 | |
| KR | 10-2001-0012376 | * | 10/2002 | ............. B01J 35/04 |
| KR | 10-0382050 | * | 5/2003 | ............. B01J 23/56 |
| KR | 100382050 | B1 | 5/2003 | |
| KR | 101251499 | B1 | 4/2013 | |

* cited by examiner

OXIDATION CATALYST, METHOD FOR PREPARING SAME, AND FILTER FOR EXHAUST GAS PURIFICATION COMPRISING SAME

CROSS-REFERENCE TO RELATED APPLICATION

This application is a national phase entry under 35 U.S.C. § 371 of International Application No. PCT/KR2014/011083, published in Korea, filed on Nov. 18, 2014, which claims priority to Korean Patent Application No. 10-2013-0139899, filed on Nov. 18, 2013, and Korean Patent Application No. 10-2014-0045435, filed on Apr. 16, 2014, the disclosures of which are incorporated herein by reference.

TECHNICAL FIELD

The present disclosure relates to an oxidation catalyst, a method of preparing the same, and an exhaust gas purification filter including the same. More particularly, the present disclosure relates to an oxidation catalyst able to be prepared at low cost since the composition thereof includes an amorphous metal alloy powder, able to improve the efficiency of exhaust gas purification when applied to an exhaust gas purification filter, and able to contribute to improvements in the reliability of the operation of an exhaust gas purifier in which the exhaust gas purification filter is disposed. In addition, the present disclosure relates to a method of preparing the oxidation catalyst and an exhaust gas purification filter including the oxidation catalyst.

BACKGROUND ART

In general, exhaust gases discharged through the operation of a variety of combustion reactors in various types of facilities, such as power plants, ironworks, and incinerators, may be incompletely combusted due to low temperatures, moisture contents, insufficient amounts of oxygen, and the like. Carbon monoxide (CO), a most common gas discharged to the air through incomplete combustion, has a serious effect on the supply of oxygen to the human brain when inhaled into the human respiratory tract. Thus, strong regulations for reducing the CO concentrations of exhaust gases discharged from thermal power plants, ironworks, and means for transportation, such as vehicles, will enter into force.

Therefore, oxidation catalysis systems for converting harmful components, such as carbon monoxide and hydrocarbons, into non-harmful components have been developed. FIG. 1 illustrates a catalytic converter as an example of such oxidation catalysis systems. The catalytic converter has a structure in which the surface of a porous ceramic filter including a substrate and a carrier is coated with catalyst particles. The catalyst of the catalytic converter allows carbon monoxide or hydrocarbons introduced into the catalytic converter to react with oxygen supplied to the catalytic converter. Through this reaction, carbon monoxide or hydrocarbons are converted into carbon dioxide or water, which may then be discharged from the catalytic converter.

Here, an element such as platinum (Pt) or rhodium (Rh) having superior reactivity and stability is typically used for the catalyst coating the surface of the porous ceramic filter. However, Pt and Rh are rare earth metals having limited reserves, while the prices thereof are recently showing rapid growth due to increased demand therefor. This results in increases in the fabrication costs of exhaust gas purification filters. In addition, Pt may be disadvantageously deteriorated due to the growth or shedding of particles when exposed to exhaust gases, the temperature of which ranges from 500° C. to 600° C., over a long period of time, such that the efficiency of exhaust gas purification is lowered.

PRIOR ART DOCUMENT

Korean Patent No. 10-1251499 (Apr. 1, 2013)

DISCLOSURE

Technical Problem

Accordingly, the present invention has been made keeping in consideration of the above problems occurring in the related art, and the present invention is intended to propose an oxidation catalyst able to be prepared at low cost since the composition thereof includes an amorphous metal alloy powder, able to improve the efficiency of exhaust gas purification when applied to an exhaust gas purification filter, and able to contribute to improvements in the reliability of the operation of an exhaust gas purifier in which the exhaust gas purification filter is disposed. The present disclosure also proposes a method of preparing the oxidation catalyst and an exhaust gas purification filter including the oxidation catalyst.

Technical Solution

According to an aspect, the present disclosure provides an oxidation catalyst coating the surface of a carrier of an exhaust gas purification filter, wherein the oxidation catalyst is formed from an amorphous metal alloy powder.

Here, the amorphous metal alloy powder may be a mixture including at least one element selected from the group consisting of Fe, Ni, Mn, Co, Zr, and Pt and at least two elements selected from the group consisting of B, Y, Ti, P, Pd, Be, Si, C, Ag, Na, Mg, Ga, and Al.

In addition, particle sizes of the amorphous metal alloy powder may range from 0.1 μm to 10 μm.

A surface roughness value of the amorphous metal alloy powder may range from 1 nm to 10 nm.

The present disclosure also provides a method of preparing an oxidation catalyst that coats a surface of a carrier of an exhaust gas purification filter. The method may include: a melting step of melting a metal and a master alloy; a rapid cooling step of producing an amorphous metal alloy by rapidly cooling a molten metal alloy including the metal and the master alloy; and a powdering step of converting the amorphous metal alloy into powder.

In the melting step, at least one element selected from the group consisting of Fe, Ni, Mn, Co, Zr, and Pt and at least two elements selected from the group consisting of B, Y, Ti, P, Pd, Be, Si, C, Ag, Na, Mg, Ga, and Al may be used as the metal and the master alloy.

In the melting step, Fe, B, Y, Ti, and Pt may be used as the metal and the master alloy.

In the melting step, Fe, B, Y, Ti, and Pt may be used as the metal and the master alloy at ratios of at least 50 atomic % of Fe, 10 to 30 atomic % of B, 5 to 20 atomic % of Y, and 0 to 10 atomic % of Ti+Pt.

In the rapid cooling step, the molten metal alloy may be cooled at a cooling rate ranging from 100° C./s to 1,000,000° C./s.

In addition, the powdering step may include pulverization after vacuum atomization or melt spinning.

The method may further include a step of increasing a surface roughness value of the amorphous metal alloy after the powdering step.

In addition, the method may further include an oxidation step of oxidizing the amorphous metal alloy powder at a temperature ranging from 300° C. to 600° C. in an oxygen atmosphere.

Here, after the oxidation step, the oxidation catalyst formed from the amorphous metal alloy powder has a performance of converting CO into $CO_2$ of 95% or higher at 150° C. and the oxidation catalyst may not react with NO.

After the oxidation step, the oxidation catalyst formed from the amorphous metal alloy powder has an oxidation performance for $NH_3$ of 75% or higher at 300° C. and the oxidation catalyst may produce no $NO_2$ by-product during oxidation of $NH_3$.

In the oxidation step, the surface structure of the amorphous metal alloy may change from an FeO structure, in which the degree of oxidation of Fe in the amorphous metal alloy is +2, to an $Fe_2O_3$ structure, in which the degree of oxidation of Fe in the amorphous metal alloy is +3, as a heat treatment temperature increases.

In addition, the present disclosure provides an exhaust gas purification filter including: the oxidation catalyst as stated above; and a carrier, the surface of which is coated with the oxidation catalyst.

Advantageous Effects

According to the present disclosure, the oxidation catalyst prepared from an amorphous metal alloy powder having superior durability is used instead of prior-art catalysts formed from a noble metal, such as Pt or Rh. It is thereby possible to significantly lower manufacturing cost from those of the prior art. When the oxidation catalyst is applied to the exhaust gas purification filter, it is possible to improve the efficiency of exhaust gas purification, thereby contributing to improvements in the reliability of the operation of an exhaust gas purifier.

MODE FOR INVENTION

Hereinafter, reference will be made in detail to an oxidation catalyst, a method of preparing the same, and an exhaust gas purification filter including the same according to the present disclosure, in conjunction with the accompanying drawings, in which exemplary embodiments thereof are illustrated.

In addition, in the description of the present invention, detailed descriptions of known functions and components will be omitted in the case that the subject matter of the present invention is rendered unclear by the inclusion thereof.

An oxidation catalyst according to an exemplary embodiment is a catalyst coating the surface of a carrier of an exhaust gas purification filter disposed in an exhaust gas purifier provided in a power plant, an incinerator, a vessel, or the like to play a part in or promote a chemical reaction for converting harmful components, such as Co or $NH_3$, contained in exhaust gases, into non-harmful components. The oxidation catalyst according to the present embodiment contains an amorphous metal alloy powder.

Figure 1:
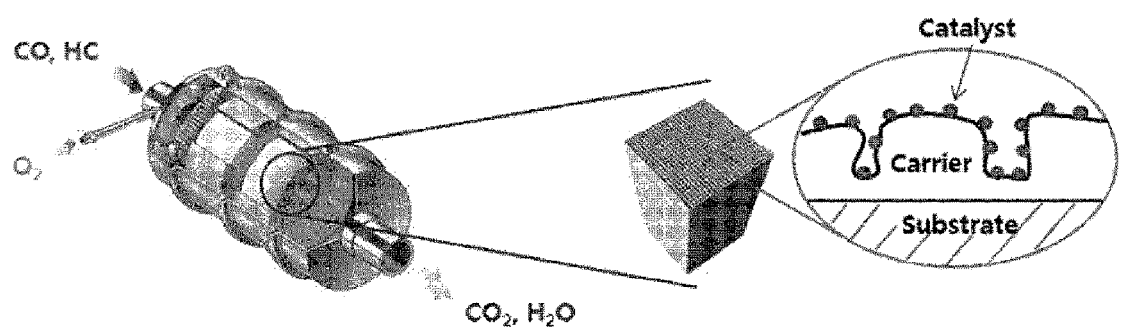
FIG. 1 is a configuration view schematically illustrating a typical catalytic converter.
Figure 2:
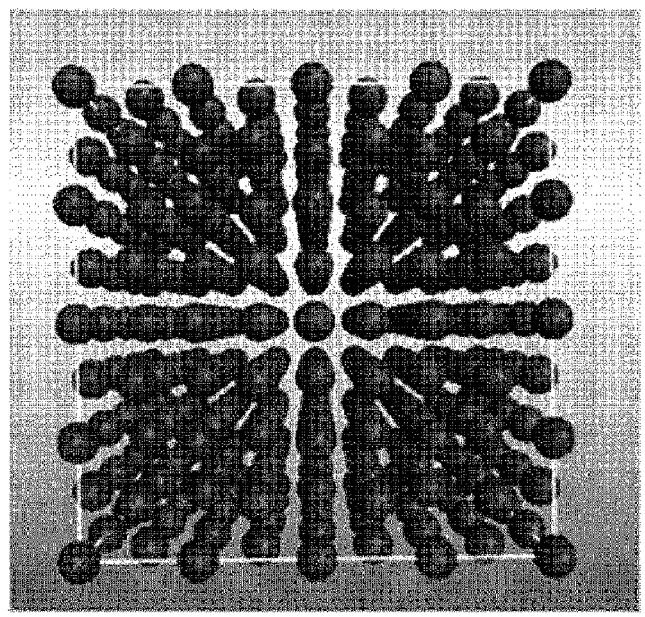
FIG. 2 is a conceptual view illustrating the atomic structure of a crystalline metal.
Figure 3:
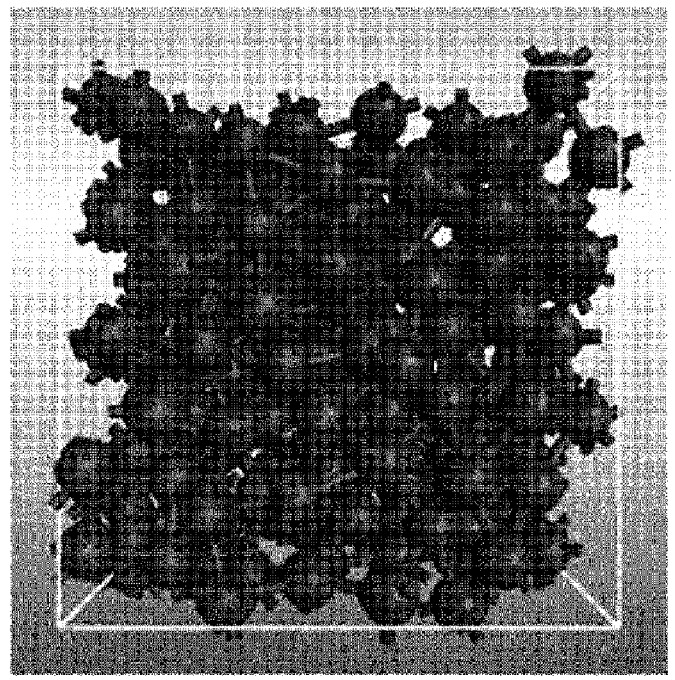
FIG. 3 is a conceptual view illustrating the atomic structure of an amorphous metal.

Comparing an amorphous metal with a crystalline metal with reference to FIG. 2 and FIG. 3, the amorphous metal is characterized by having very high surface energy and activity, since the atomic structure of the surface thereof is highly disordered and a plurality of dangling bonds representing defects between atomic bonds are formed. In addition, the amorphous metal may have higher erosion resistance and higher mechanical strength than the crystalline metal, due to physical, chemical, and structural factors.

Thus, the oxidation catalyst according to the present embodiment is used as a catalyst for purifying exhaust gases on the basis of such characteristics of the amorphous metal. When the oxidation catalyst according to the present embodiment formed from an amorphous metal alloy powder is used to purify exhaust gases, it is possible to improve the efficiency of exhaust gas purification compared to prior-art processes in which noble metal catalysts are used. In addition, the oxidation catalyst can be prepared at low cost, such that an exhaust gas purification filter having the oxidation catalyst provided as an exhaust gas purification catalyst can be fabricated at a significantly low cost.

In addition, the amorphous metal alloy has superior durability, since the amorphous metal alloy is neither condensed nor crystallized by exhaust gases having a temperature ranging from 500° C. to 600° C. Thus, the oxidation catalyst formed from the amorphous metal alloy is not shed from the carrier of the exhaust gas purification filter when exposed to exhaust gases over a long period of time, thereby contributing to improvements in the reliability of the operation of an exhaust gas purifier in which the exhaust gas purification filter including the oxidation catalyst is disposed.

The oxidation catalyst as described above may be formed from an amorphous metal alloy powder produced by mixing at least one selected from the group consisting of Pt, Ni, Fe, Co, and Zr and at least one selected from the group consisting of B, P, Pd, Be, Si, C, Ag, Na, Mg, Ga, Y, Ti, and Al. That is, the composition of the oxidation catalyst according to the present embodiment may include three or more elements.

In addition, the particle size of the amorphous metal alloy powder of the oxidation catalyst may range from 0.1 μm to 10 μm. Furthermore, it is preferable that the surface roughness of the oxidation catalyst of the oxidation catalyst ranges from 1 nm to 10 nm such that the oxidation catalyst has an optimal specific surface area for a catalyst.

Hereinafter, reference will be made to a method of preparing an oxidation catalyst according to an exemplary embodiment.

Figure 4:
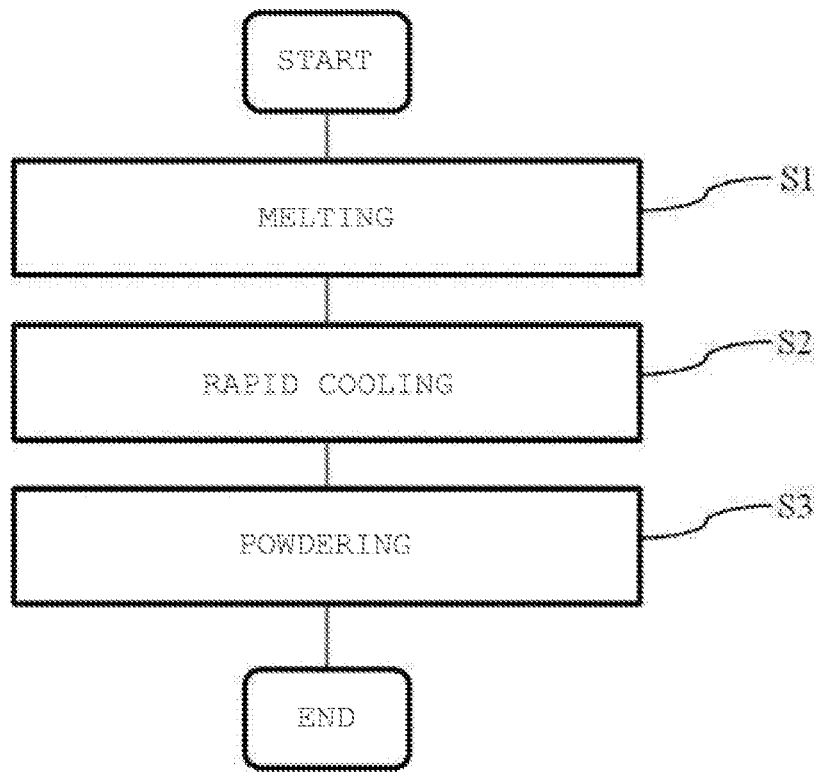
FIG. 4 is a flowchart sequentially illustrating the process steps of a method of preparing an oxidation catalyst according to an exemplary embodiment.

As illustrated in FIG. 4, the method of preparing an oxidation catalyst according to the present embodiment is a method of preparing an oxidation catalyst that coats the surface of a carrier of an exhaust gas purification filter disposed in an exhaust gas purifier provided in a power plant, an incinerator, a vessel, or the like, and includes a melting step S1, a rapid cooling step S2, and powdering step S3.

First, the melting step S1 is a step of melting a metal and a master alloy. That is, in the melting step S1, a molten liquid metal alloy is prepared by inserting the metal and the master alloy into a crucible and then heating the metal and the master alloy. In the melting step S1, at least one element selected from the group consisting of Fe, Ni, Mn, Co, Zr, and Pt and at least two elements selected from the group consisting of B, Y, Ti, P, Pd, Be, Si, C, Ag, Na, Mg, Ga, and Al may be used as the metal and the master alloy. For example, in the melting step S1, Fe, B, Y, Ti, and Pt may be selected as the metal and the master alloy. In this case, in the melting step S1, the content ratios of the metal and the master alloy may be controlled to be at least 50 atomic % of Fe, 10 to 30 atomic % of B, 5 to 20 atomic % of Y, and 0 to 10 atomic % of Ti+Pt.

The subsequent rapid cooling step S2 is a step of rapidly cooling the molten metal alloy. That is, the rapid cooling step S2 produces an amorphous metal alloy by rapidly cooling the molten metal alloy. In this regard, in the rapid cooling step S2, the molten metal alloy can be cooled at a cooling rate ranging from 100° C./s to 1,000,000° C./s. When the molten metal alloy is rapidly cooled as described above, the molten metal alloy solidifies with a disordered atomic arrangement like that of glass, thereby forming the amorphous metal alloy.

The final powdering step S3 is a step of converting the amorphous metal alloy into powder. The powdering step S3 may be vacuum atomization or melt spinning. That is, the powdering step S3 may convert the amorphous metal alloy into a coarse powder, the particle sizes of which range from 10 μm to 50 μm, through vacuum atomization, and then convert the coarse powder into a fine powder, the particle sizes of which range from 0.1 μm to 10 μm, through additional mechanical milling. In addition, the powdering step S3 may convert the amorphous metal alloy into an amorphous metal ribbon through melt spinning and then convert the amorphous metal ribbon into powder through mechanical milling.

When the powdering step S3 as described above is completed, an oxidation catalyst formed from the amorphous metal alloy powder is prepared.

The method of preparing an oxidation catalyst according to the present embodiment may further include a step of increasing the surface roughness of the amorphous metal alloy powder after the powdering step S3. Here, the surface roughness of the amorphous metal alloy powder is increased in order to improve the performance of the oxidation catalyst through obtaining a greater specific surface area and to increase the compatibility and bonding force of the exhaust gas purification filter to a ceramic carrier through obtaining the rougher surfaces. This step may be a process of forming nanoscale structures on the surface of the amorphous metal alloy powder through mechanical pulverization technology using fluid. Through this process, the metal alloy powder having an optimal specific surface area, the level of surface roughness of which ranges from 1 nm to 10 nm, may be prepared.

Hereinafter, reference will be made to the results of tests performed on the characteristics of oxidation catalysts prepared by the method of preparing an oxidation catalyst according to the present embodiment in conjunction with FIG. 5 to FIG. 15.

Figure 5:
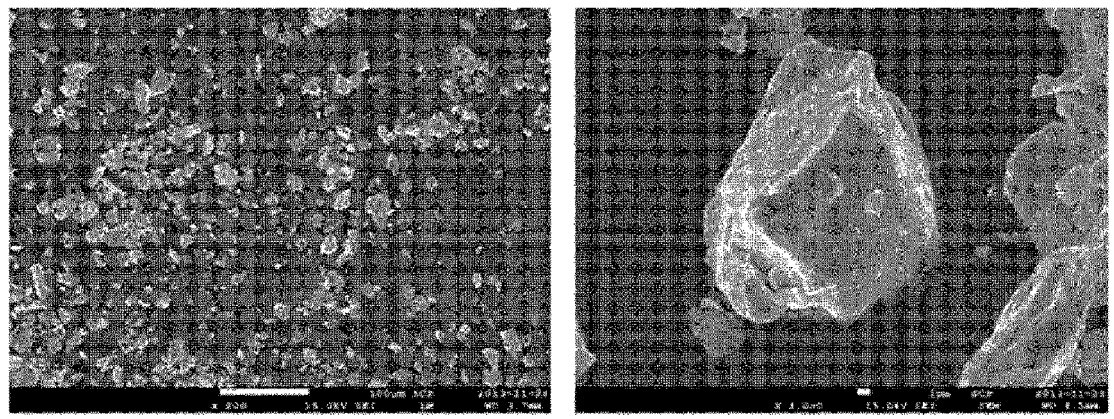
FIG. 5 is SEM micrographs illustrating the surface shapes of oxidation catalysts prepared by the method of preparing an oxidation catalyst according to the exemplary embodiment.

FIG. 5 is scanning electron microscopy (SEM) micrographs illustrating the surface shapes of oxidation catalysts prepared by the method of preparing an oxidation catalyst according to the present embodiment. In the present embodiment, oxidation catalyst samples formed from $(Fe_{72}B_{22}Y_6)Ti_2$ and $((Fe_{72}B_{22}Y_6)Ti_2)Pt_2$ were prepared. Both of the two samples were prepared to have reproducibility through a process of repeated experimentation.

Master alloys, the compositions of which include predetermined ratios of the above-described elements, were uniformly prepared using an arc melter. Amorphous ribbons manufactured using a melt spinner were converted into powder having the surface shapes and particle sizes as illustrated in FIG. 5 through Spex milling or ball milling pulverization. Through the analysis of the SEM micrographs regarding the surface shapes and average particle sizes, it was appreciated that the particle sizes of the manufactured powders range from 5 μm to 10 μm.

Figure 6:
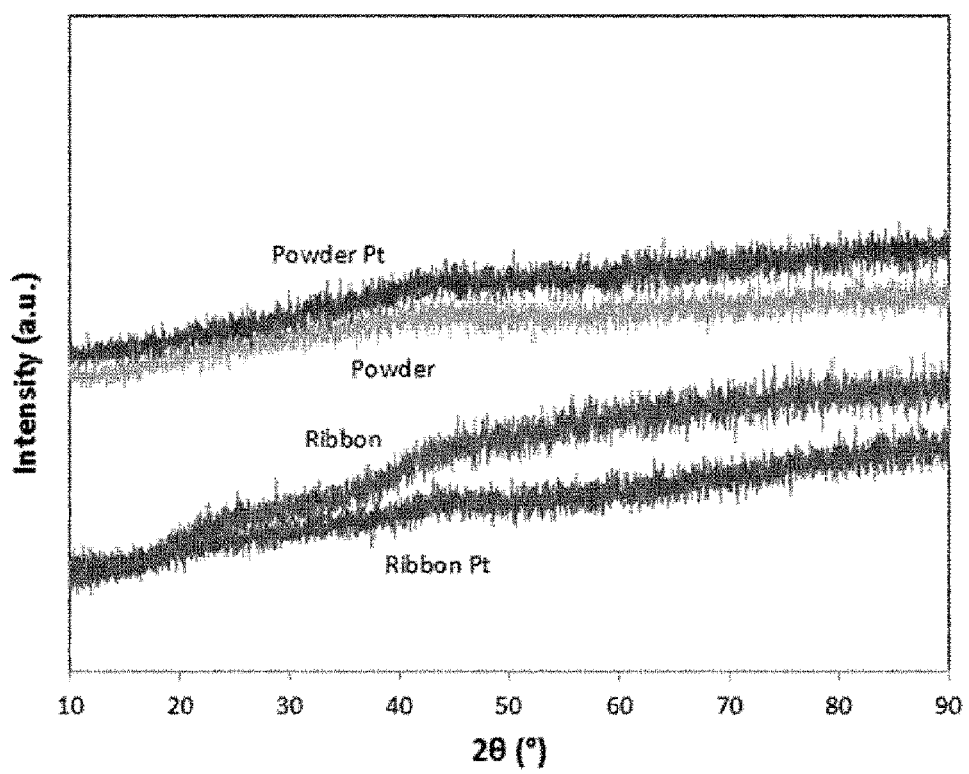
FIG. 6 is an XRD graph illustrating oxidation catalysts prepared by the method of preparing an oxidation catalyst according to the exemplary embodiment.

FIG. 6 illustrates the results of XRD analysis intended to examine the atomic structures of oxidation catalysts formed from amorphous metal alloy powders prepared according to the present embodiment. It can be appreciated that amorphous metal ribbons were manufactured by the above-described method as expected, since the ribbons manufactured had no XRD peaks but had wide XRD patterns representing the uniform amorphous structure. Since the powder samples had the same patterns after Spex milling, it can be appreciated that no crystallization occurred during the milling.

Figure 7:
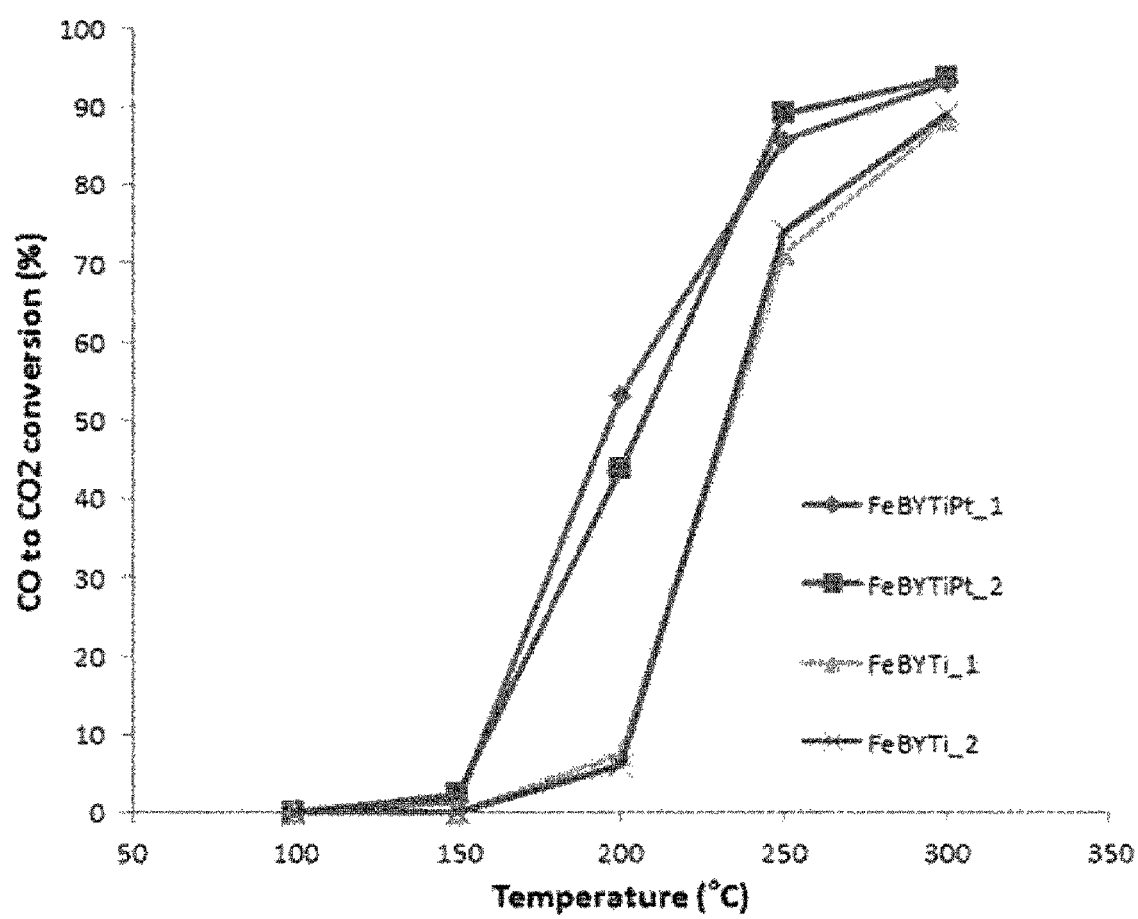
FIG. 7 is a graph illustrating the results of CO oxidation tests performed on oxidation catalysts prepared by the method of preparing an oxidation catalyst according to the exemplary embodiment.

FIG. 7 is a graph illustrating CO oxidation performance measured to examine the performance of oxidation catalysts formed from amorphous metal alloys prepared according to the present embodiment. It can be appreciated from FIG. 7 that Fe-based amorphous metal powders clearly had CO oxidation catalytic activity as the CO conversion ratios of two sample compositions reached 70% or higher at a temperature of 250° C. or higher. In addition, it can be appreciated that the sample composition including 2 atomic % of Pt element had higher oxidation catalytic performance as expected. As represented in the graph, two times of repeated experimentation showed uniform test results, thereby making the test results reliable.

In FIG. 7, CO oxidation tests were performed right after the oxidation catalysts were formed from the amorphous metal alloy powders. However, pretreatment of oxidizing or reducing the samples at several hundred degrees (300° C. to 700° C.) is generally performed in order to improve the performance of the oxidation catalysts. The pretreatment makes it possible to adjust the oxidation states of the oxidation catalysts formed from the amorphous metal alloy powders and optimize catalytic activities for materials.

Figure 8:
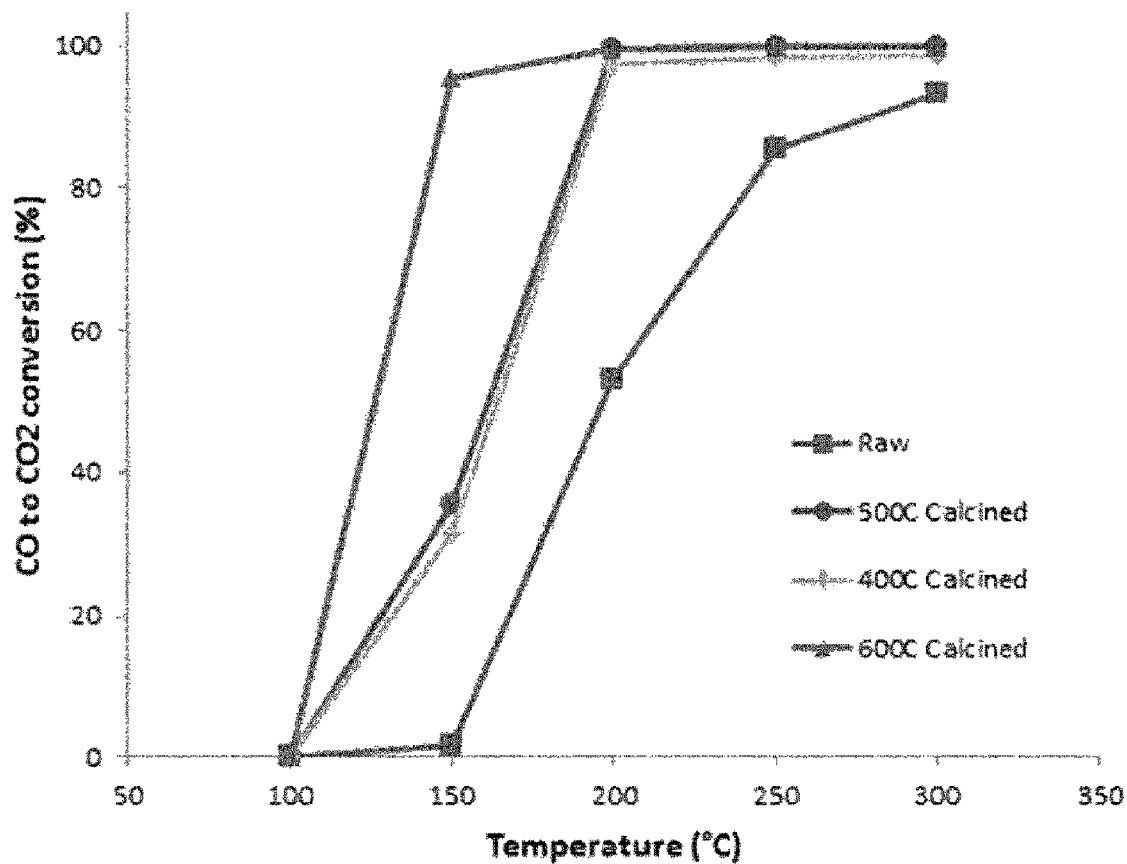
FIG. 8 is a graph illustrating the results of CO oxidation tests performed, after pretreatment, on oxidation catalysts prepared by the method of preparing an oxidation catalyst according to the exemplary embodiment.

FIG. 8 illustrates changes in the CO oxidation performance of prepared amorphous metal alloy powder samples after pretreatment (high temperature oxidation). As represented in the graph, when CO oxidation was performed after high temperature oxidation performed on samples at 400° C., 500° C., and 600° C., all the samples had improvements in oxidation performance. In particular, in the case of oxidation at 600° C., the CO conversion ratio was higher than 95% in a relatively low temperature range of 150° C. This conversion ratio exceeds the conversion ratio of Pt, a commercially-available catalyst.

Figure 9:
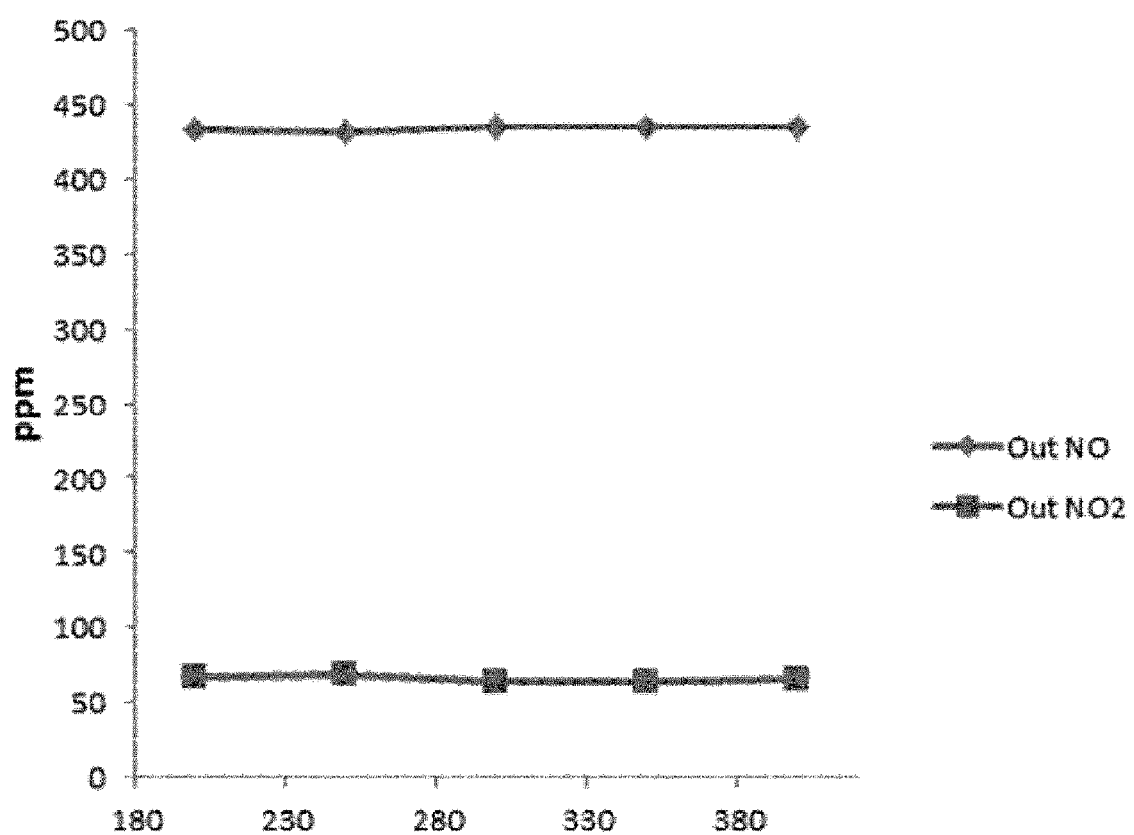
FIG. 9 is a graph illustrating an NO oxidation test result performed on the oxidation catalyst prepared by the method of preparing an oxidation catalyst according to the exemplary embodiment.

FIG. 9 is a graph illustrating an NO oxidation test result intended to examine whether or not an oxidation catalyst sample formed from an amorphous metal alloy prepared as described above has an effect on NO oxidation. This test was designed to measure changes in the concentration of $NO_2$ after NO was flown over the sample. However, as illustrated in the result of FIG. 9, NO injected in a wide temperature range was determined to be discharged without being converted into $NO_2$ at all.

Figure 10:
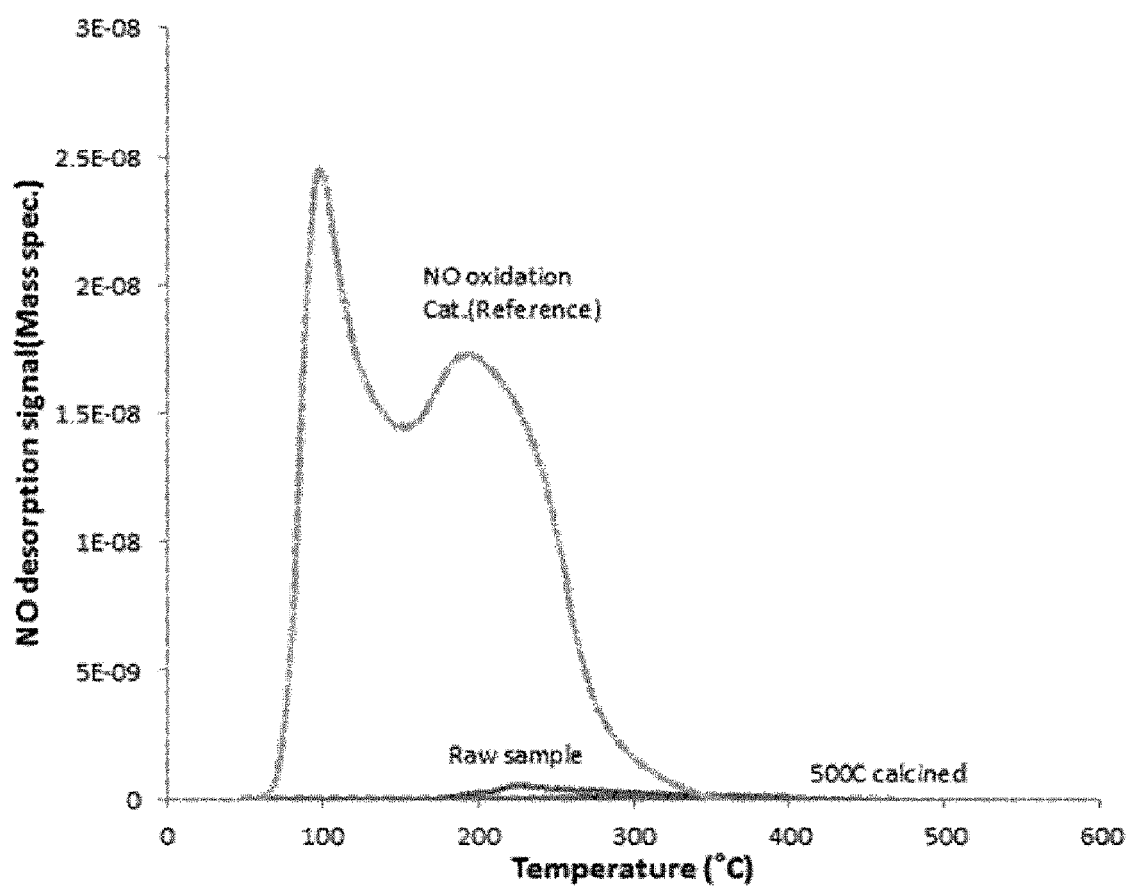
FIG. 10 is a graph illustrating NO-TPD test results performed on the oxidation catalyst prepared by the method of preparing an oxidation catalyst according to the exemplary embodiment.

Thus, NO-temperature programmed desorption (NO-TPD) tests were performed in order to determine the reason why the prepared oxidation catalyst sample does not have an effect on NO oxidation differently from superior CO oxidation performance, and the results are illustrated in FIG. 10. NO-TPD is intended to examine performance for NO molecule absorption. First, samples were saturated in NO, and then, desorption signals of NO were analyzed while the temperature was being raised, whereby amounts of NO absorbed in the sample were calculated.

It can be appreciated from the results of FIG. 10 that the oxidation catalyst prepared according to the present embodiment did not absorb NO at all since substantially no amount of NO desorption was measured before and after pretreatment, while the NO oxidation catalyst developed in the prior art absorbed a significant amount of NO and thus amounts of NO desorption could be clearly measured. Since the oxidation catalyst sample absorbs substantially no amount of NO, the oxidation catalyst has selective CO oxidation property.

The selective CO oxidation performance of the oxidation catalyst prepared according to the present embodiment is applicable to a variety of important industrial fields. In particular, at present, commercially available Pt catalysts are generally used in order to oxidize CO in exhaust gases from power plants or incinerators. A side effect of this process is $NO_2$ generation occurring as a side reaction. Unlikely colorless and odorless NO, $NO_2$ forms a noticeable yellow fume with an odor when only a 15 ppm of $NO_2$ is contained in the air. In order to overcome this problem, an additional process, such as ethanol input, is required. In contrast, the oxidation catalyst prepared according to the present embodiment is completely selective for CO and thus does not cause a side reaction, such as $NO_2$ generation. Thus, an additional process, such as ethanol input, is not required.

Figure 11:
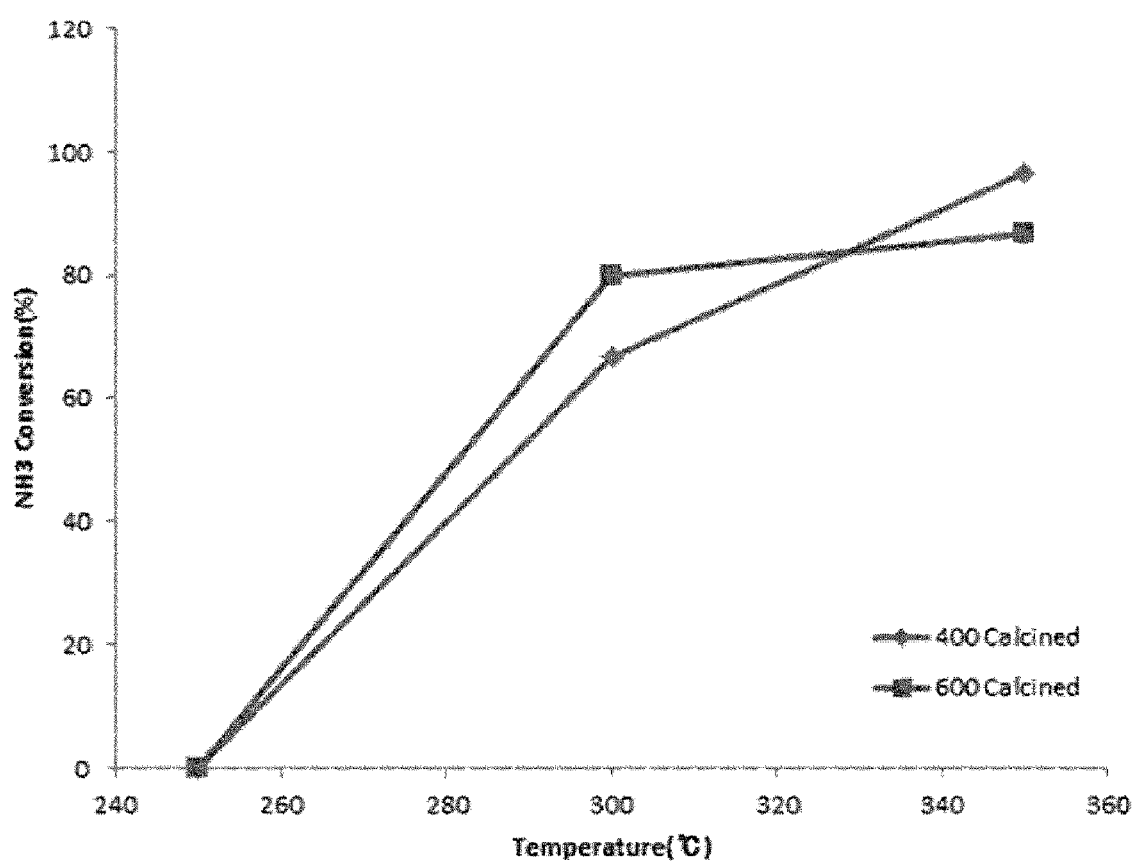
FIG. 11 is a graph illustrating $NH_3$ oxidation test results performed, after pretreatment, on the oxidation catalyst prepared by the method of preparing an oxidation catalyst according to the exemplary embodiment.

FIG. 11 is a graph illustrating oxidation test results performed on ammonia ($NH_3$) using oxidation catalyst samples prepared according to the present embodiment. It can be appreciated from the result graph that both of the samples pretreated at 400° C. and 600° C. had ammonia conversion ratios of 80% or higher in a temperature range of 300° C.

Figure 12:
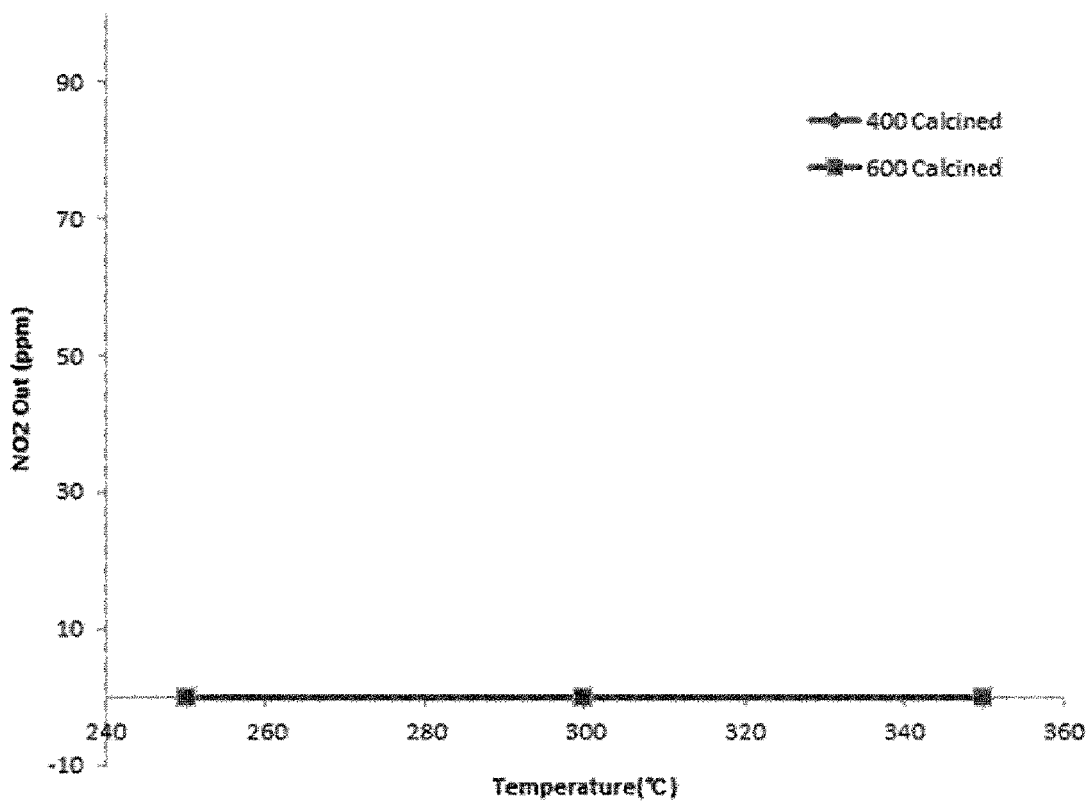
FIG. 12 is a graph illustrating $NO_2$ concentration measurements during the $NH_3$ oxidation test performed, after pretreatment, on the oxidation catalyst prepared by the method of preparing an oxidation catalyst according to the exemplary embodiment.

FIG. 12 is a graph illustrating $NO_2$ concentration measurements intended to determine whether or not a $NO_2$ side reaction occurs in gases converted through ammonia oxidation tests illustrated in FIG. 11. This graph indicates that the $NO_2$ concentration was 0 ppm, i.e. no $NO_2$ was produced. As appreciated from the NO-TPD tests, it can be interpreted as the result of selective oxidation in which an NO molecule produced during the oxidation of ammonia is not absorbed to the surface of amorphous metal alloy powder and thus is not converted to $NO_2$. An application of selective oxidation of ammonia is found in a De-$NO_x$ SCR system that treats residual ammonia caused by slips or treats ammonia produced as a by-product in several chemical processes. When this system uses the oxidation catalyst prepared according to the present embodiment, an oxidation catalyst system can be realized without the problem of the odor and the yellow fume of $NO_2$.

Figure 13:
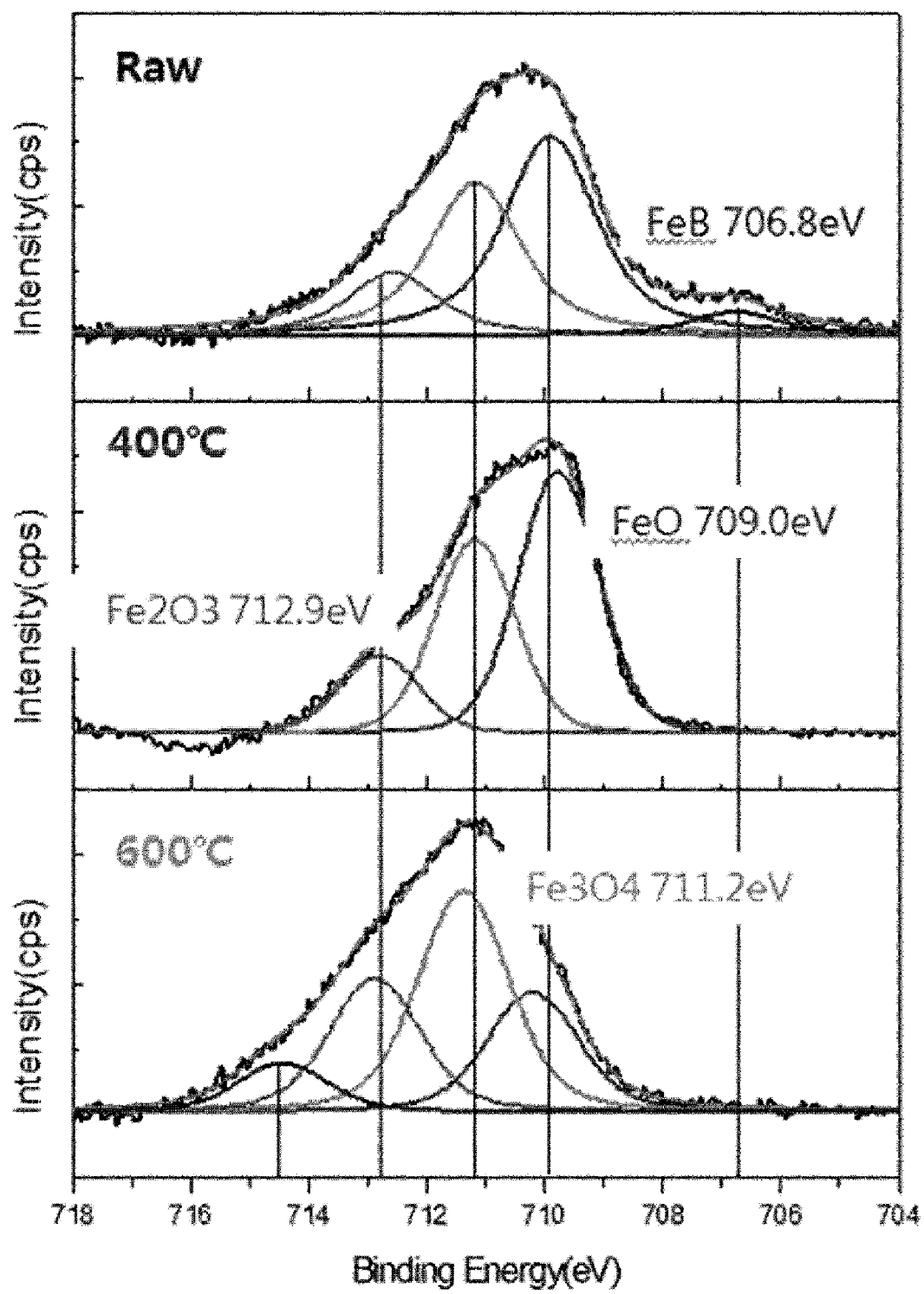
FIG. 13 is a graph illustrating XPS changes depending on oxidation performed on the oxidation catalyst prepared by the method of preparing an oxidation catalyst according to the exemplary embodiment.

FIG. 13 illustrates XPS data about Fe in metal components contained in a sample right after being powdered and samples oxidized after being powdered in the method of preparing an oxidation catalyst according to the present embodiment. It was possible to measure the binding energy levels of elements based on the XPS data and predict the atomic structure of the surface of expected materials based on the binding energy levels, thereby determining the oxidation states of metals. As appreciated from the graphs in FIG. 13, it is possible to determine the positions and intensities of peaks in three typical iron oxides, i.e. FeO (Fe oxidation state; +2), $Fe_2O_3$ (+3), and $Fe_3O_4$ (+8/3), by measuring the XPS peaks of Fe, the major element of the prepared oxidation catalysts. As appreciated from the XPS result graphs, in the case of samples prior to pretreatment, FeO, in which the degree of oxidation of Fe is +2, has most peaks. After pretreatment at 400° C., peaks gradually increase in $Fe_2O_3$ and $Fe_3O_4$. In particular, this tendency is more prominent after pretreatment at 600° C. Comparing with the results (FIG. 8) in which the CO oxidation performance is higher as the pretreatment temperature gradually increases as in the 400° C. and 600° C. pretreatments, it can be concluded that the catalytic performance will be higher as the surface structure is closer to the surface structure of $Fe_2O_3$, in which the degree of oxidation changes from +2 to +3.

Figure 14:
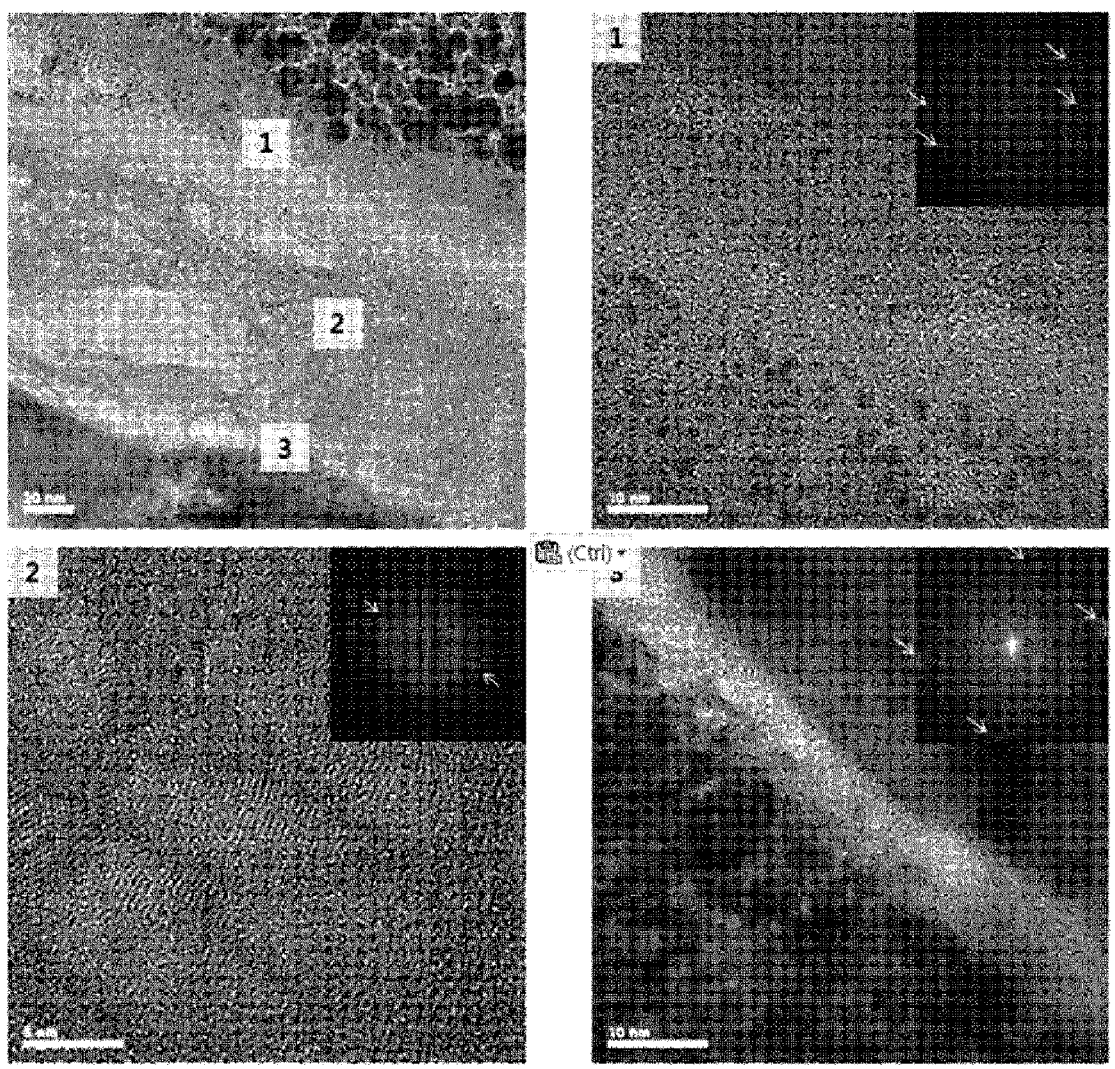
FIG. 14 is TEM micrographs of the oxidation catalyst prepared by the method of preparing an oxidation catalyst according to the exemplary embodiment.

In general, metal oxides, such as FeO and $Fe_2O_3$, have regular crystal structures. FIG. 14 illustrates the results of transmission electron microscopy (TEM) measurements intended to analyze the atomic structures of the surfaces of iron oxides, determined based on the XPS data, in order to examine the regular crystal structures. As expected from the XPS, a crystalline portion in the amorphous structure of the initial amorphous metal caused by surface oxidation was observed from the TEM micrographs. It can be appreciated from a fast Fourier transform (FFT) image that nano crystalline structures caused by partial surface oxidation are partially distributed although not distributed over the entire surface.

Figure 15:
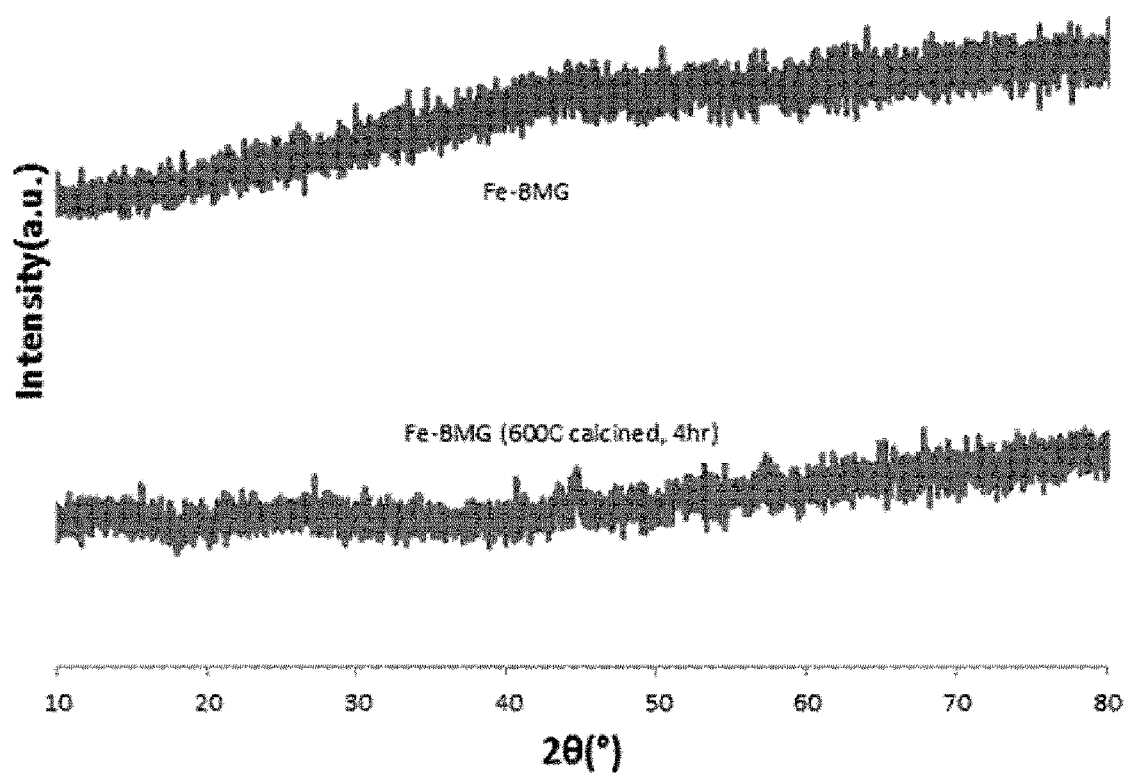
FIG. 15 is an XRD graph illustrating the oxidation catalyst prepared by the method of preparing an oxidation catalyst according to the exemplary embodiment before and after oxidation.

Although specific portions of the surface of the oxidation catalyst prepared according to the present embodiment were crystallized due to oxidation, the oxidation catalyst generally has superior durability, since the amorphous metal alloy forming the oxidation catalyst is neither condensed nor crystallized by exhaust gases having a temperature ranging from 500° C. to 600° C. As illustrated in FIG. 15, right after the powdering step and after oxidation pretreatment at 600° C. following the powdering step, amorphous XRD patterns were measured through XRD analysis. That is, regarding the overall particle structure, it can be appreciated that the same structure was maintained without crystallization after calcination performed at 600° C. for four hours. Thus, the oxidation catalyst formed from the amorphous metal alloy powder according to the present embodiment is free from deterioration, growth, or the like and thus is not shed from the surface of a carrier of an exhaust gas purification filter, even after having been exposed to exhaust gases for a long period of time. Thus, the performance of the oxidation catalyst is superior to those of the Pt and Rd catalysts of the prior art.

In addition, the oxidation catalyst prepared according to the present embodiment is applied to an exhaust gas purification filter. Specifically, the exhaust gas purification filter may include a carrier, the surface of which is coated with the oxidation catalyst prepared according to the present embodiment. The exhaust gas purification filter may be fabricated by forming slurry by mixing an oxidation catalyst formed from an amorphous metal alloy powder into a solvent and coating the surface of a porous carrier with an oxidation catalyst layer by immersing the porous carrier into the slurry.

Describing in greater detail, in order to fabricate the exhaust gas purification filter, first, the slurry is formed by diluting the oxidation catalyst with an aqueous solvent, an alcoholic solvent, or a mixture thereof. In this case, it is preferable that the oxidation catalyst is added at a ratio ranging from 10 wt % to 50 wt % of the solvent.

The solvent as described above may include a dispersant to improve the dispersibility of the oxidation catalyst. The dispersant may include a surfactant, such as CTAB or DTAB, in order to realize dispersibility based on steric hindrance or may include at least one salt selected from among $NH_4OH$, NaCl, and $NH_4Cl$ in order to realize electrical dispersibility.

Afterwards, the oxidation catalyst layer is formed on the surface of the carrier by immersing the porous carrier into the prepared slurry. Here, it is preferable that the thickness of the oxidation catalyst layer is controlled to range from 0.5 μm to 5 μm.

Subsequently, the solvent is evaporated by heating the porous carrier having the oxidation catalyst layer on the surface thereof at a temperature ranging from 100° C. to 150° C. for two hours. The oxidation catalyst layer is then sintered by heating the porous carrier at a temperature ranging from 450° C. to 550° C., thereby completing the fabrication of the exhaust gas purification filter.

The foregoing descriptions of specific exemplary embodiments of the present disclosure have been presented with respect to the drawings. They are not intended to be exhaustive or to limit the present disclosure to the precise forms disclosed herein, and many modifications and variations are obviously possible for a person having ordinary skill in the art in light of the above teachings.

It is intended therefore that the scope of the present disclosure not be limited to the foregoing embodiments, but be defined by the Claims appended hereto and their equivalents.

The invention claimed is:

1. A method of preparing an oxidation catalyst that coats a surface of a carrier of an exhaust gas purification filter, the method comprising:
   a melting step of melting a metal and a master alloy, producing a molten metal alloy comprising the metal and the master alloy;
   a rapid cooling step of producing an amorphous metal alloy by rapidly cooling the molten metal alloy; and
   a powdering step of converting the amorphous metal alloy into powder, wherein the powdering comprises pulverization after vacuum atomization or melt spinning.

2. The method of claim 1, wherein, in the melting step, at least one element selected from the group consisting of Fe, Ni, Mn, Co, Zr, and Pt and at least two elements selected from the group consisting of B, Y, Ti, P, Pd, Be, Si, C, Ag, Na, Mg, Ga, and Al are used as the metal and the master alloy.

3. The method of claim 2, wherein, in the melting step, Fe, B, Y, Ti, and Pt are used as the metal and the master alloy.

4. The method of claim 3, wherein, in the melting step, Fe, B, Y, Ti, and Pt are used as the metal and the master alloy at ratios of at least 50 atomic % of Fe, 10 to 30 atomic % of B, 5 to 20 atomic % of Y, and 0 to 10 atomic % of Ti+Pt.

5. The method of claim 1, wherein, in the rapid cooling step, the molten metal alloy is cooled at a cooling rate ranging from 100° C./s to 1,000,000° C./s.

6. The method of claim 1, further comprising a step of increasing a surface roughness value of the amorphous metal alloy after the powdering step.

7. The method of claim 1, further comprising an oxidation step of oxidizing the amorphous metal alloy powder at a temperature ranging from 300° C. to 600° C. in an oxygen atmosphere.

8. The method of claim 7, wherein, after the oxidation step, the oxidation catalyst comprising the amorphous metal alloy powder has a performance of converting CO into $CO_2$ of 95% or higher at 150° C. and does not react with NO.

9. The method of claim 7, wherein, after the oxidation step, the oxidation catalyst comprising the amorphous metal alloy powder has an oxidation performance for $NH_3$ of 75% or higher at 300° C. and produces no $NO_2$ by-product during oxidation of $NH_3$.

10. The method of claim 7, wherein, in the oxidation step, a surface structure of the amorphous metal alloy changes from an FeO structure, in which a degree of oxidation of Fe in the amorphous metal alloy is +2, to an $Fe_2O_3$ structure, in which a degree of oxidation of Fe in the amorphous metal alloy is +3, as a heat treatment temperature increases.

* * * * *